United States Patent

[11] 3,634,874

| [72] | Inventor | Raymond J. Mason<br>Lynwood, Calif. |
|---|---|---|
| [21] | Appl. No. | 58,257 |
| [22] | Filed | July 27, 1970 |
| [45] | Patented | Jan. 11, 1972 |
| [73] | Assignee | Minarik Electric Company<br>Los Angeles, Calif. |

[54] TRIAC MOTOR SPEED CONTROL
10 Claims, 4 Drawing Figs.

[52] U.S. Cl........................................................ 318/345
[51] Int. Cl........................................................ H02p 5/16
[50] Field of Search............................................ 318/331, 345

[56] References Cited
UNITED STATES PATENTS

| 3,222,583 | 12/1965 | Gutzwiller.................. | 318/345 |
| 3,402,338 | 9/1968 | Thoresen...................... | 318/345 |
| 3,177,417 | 4/1965 | Wright........................ | 318/331 |
| 3,177,418 | 4/1965 | Meng........................... | 318/345 |
| 3,508,134 | 4/1970 | Dosch.......................... | 318/345 |
| 3,553,556 | 1/1971 | Dosch.......................... | 318/345 |

Primary Examiner—Bernard A. Gilheany
Assistant Examiner—Thomas Langer
Attorney—Beehler & Arant ABSTRACT: A motor speed control including a fullwave diode bridge rectifier for rectifying alternating current received from a supply circuit, a triac coupled in a series loop circuit with the bridge rectifier and the supply line for controlling the flow of current through the bridge rectifier during both positive and negative half-cycles of the supply line voltage, and a control circuit for controlling the firing of the triac, the control circuit including a diac coupled in series with a timing capacitor. A speed-setting potentiometer, coupled in series with the timing capacitor, is utilized for selecting the operating speed of the motor.

INVENTOR
RAYMOND J. MASON
BY Beehler & Arant
ATTORNEYS

INVENTOR.
RAYMOND J. MASON
BY
Beehler & Arant
ATTORNEYS

TRIAC MOTOR SPEED CONTROL

Various specific circuit features are utilized for providing a smooth variable voltage control in the low speed range of the motor; for selectively varying the amount of regenerative feedback which is inherent in the circuit of the present invention when utilized with certain types of motors; for stabilizing the circuit against changes in line voltage; and for producing a regenerative feedback action through a circuit loop that is specially provided for that purpose.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENTION

During the past several years it has become well known to utilize a Triac for controlling a power supply circuit which operates on full-wave alternating current, with the firing of the Triac during each half of the cycle being controlled by a diac. The breakdown of the diac is, in turn, accomplished by the charge stored on a timing capacitor which is part of an RC circuit coupled generally in parallel with the Triac. In that well-known basic circuit the firing of the diac, and hence of the Triac, is controlled in response to a control signal developed as a function of either the line voltage or the voltage appearing across the Triac.

According to the present invention Triac circuits are applied to the problem of motor speed control. There are many applications of electric motors where the mechanical load on the motor may vary but it is desirable to maintain the motor speed constant. Such an electric motor may, for example, be a direct-current motor of either the permanent magnet or wound field type, or an alternating-current motor of either the shaded pole or repulsion type. If voltage is simply maintained as the motor load increases the result is a drop in motor speed, and in order to maintain the speed constant it is necessary to actually increase the voltage supplied to the motor.

According to the present invention a control signal is developed as a function of the voltage appearing across the supply line or across the Triac, by utilizing an RC circuit which is charged first in one direction and then in the other, and this control signal is stored on the timing capacitor and applied to the diac in essentially the same manner as heretofore known. There is also additional circuitry which develops a regenerative feedback signal, which is combined with the traditional control signal so that the precise point of time in each half-cycle when the Triac fires is determined as a composite function of the two signals. A more precise control of the motor speed, as mechanical load on the motor changes is therefore achieved.

Thus, the main object and purpose of the present invention is to provide novel Triac circuits which may be advantageously used as motor speed controls.

Another object of the invention is to provide novel Triac circuits for voltage control, which may be used for any desired application with any desired type of load.

The present invention is an improvement over that disclosed in copending application Ser. No. 7,740 filed Feb. 2, 1970 and assigned to the same assignee as the present application.

DRAWING SUMMARY

GENERAL OPERATION

Figure 1:
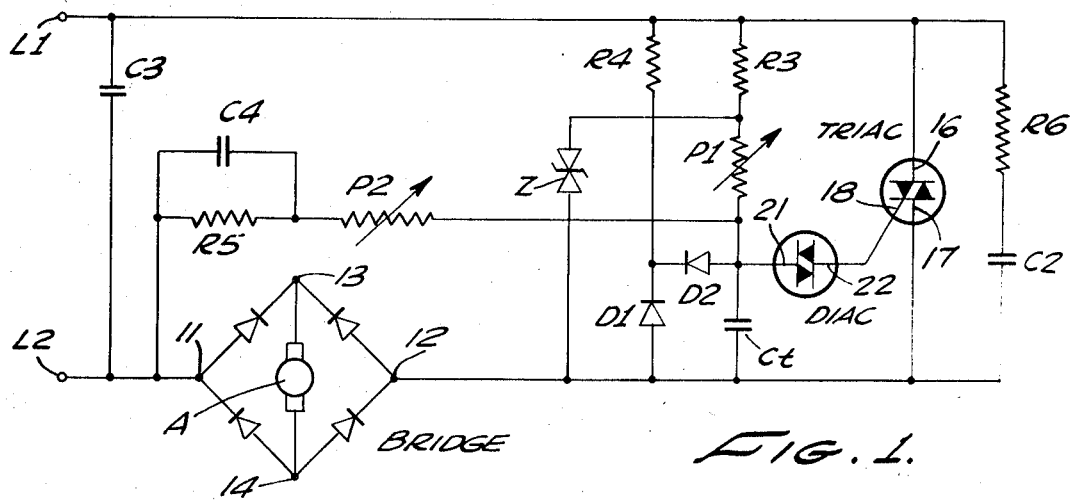
FIG. 1 is a schematic diagram of one form of motor speed control circuit in accordance with the present invention.

The control circuits of the present invention have certain features in common which are also contained in the "triac-controlled power supply cicuits" which are described and claimed in the copending application Ser. No. 7,740 filed 02–02–70. These general features of construction and operation will now be described.

The motor speed control is preferably contained in a single package and includes terminals L1 and L2 adapted for connection to an alternating voltage energy source, terminals such as 13, 14 for connection to a motor armature A which serves as the load, and a speed setting potentiometer P1 having a manually operable adjustment control. The external supply voltage is typically 115 volts at 60 Hertz. The packaging of a motor speed controller in this manner is well known in the art at the present time.

The internal circuitry of the controller includes a bridge rectifier identified as "Bridge" and a triac identified as Triac which are coupled in a series loop circuit with the alternating supply voltage source and also with the motor load. The bridge rectifier has input terminals 11,12 and output terminals 13,14. The Triac has main current terminals 16,17 and a control gate 18. The input terminals 11,12 of the bridge rectifier are coupled in series with main current terminals 16, 17 of the Triac between the supply line terminals L1 and L2. The output terminals 13,14 of the bridge circuit are connected to the motor armature A by means of detachable connections, not specifically shown in the present drawings.

The function of the bridge rectifier circuit is to provide full-wave rectification of the supply line current so that a pulsating unidirectional current may be delivered to the motor armature A. The function of the Triac is to act as a shut-off valve on both halves of the current cycle, inhibiting the flow of current through the bridge rectifier and the motor armature during the initial portion of each half-cycle of the applied voltage wave, but permitting current flow during the latter portion of each half-cycle. The point of time during each half-cycle at which the Triac is permitted to become conductive is controlled in such a manner as to achieve as accurately as possible, the desired speed control of the motor.

A Diac having electrodes 21,22 is used for triggering the Triac into conduction, while a timing capacitor Ct is used for bringing the Diac to its breakover voltage. Electrode 22 of the Diac is connected to control gate 18 of the Triac. Timing capacitor Ct is connected between main current terminal 17 of the Triac and electrode 21 of the Diac, which may be referred to as the input electrode. Other control circuitry is utilized for controlling the charge on timing capacitor Ct, and it is that other control circuitry which is the subject of the present invention as herein disclosed.

The circuit of the present invention, in each of its forms, also includes a filter capacitor C3 which is connected directly between supply terminals L1 and L2. The function of capacitor C3 is to filter spurious voltage pulses that may exist on the supply line, and prevent them from damaging the internal circuitry of the speed control.

Each form of the circuit of the present invention includes, also, a resistor R6 connected in series with a capacitor C2, the series combination being connected between main current terminals 16 and 17 of the Triac. The bypass circuit provided by R6 and C2 is commonly known as the $dV/dt$ circuit and is used to prevent false triggering of the Triac. The operation of the Bridge rectifier is such as to cause the successive half-cycles of the supply voltage to be rectified and to reach the motor armature all in the same polarity sense. The Triac and the Diac, however, receive the unrectified supply voltage consisting of alternately positive and negative half waves. After the initiation of each new half-cycle of the supply voltage the timing capacitor Ct charges up (with appropriate charge polarity) to the Diac breakover voltage of approximately 32 volts. Firing of the Diac then initiates conduction of the Triac, which conducts current for the remainder of that half-cycle. The rate of charging of capacitor Ct, and hence the precise firing time of the Diac, are determined by the control circuit which is the subject of the present invention.

Figure 2:
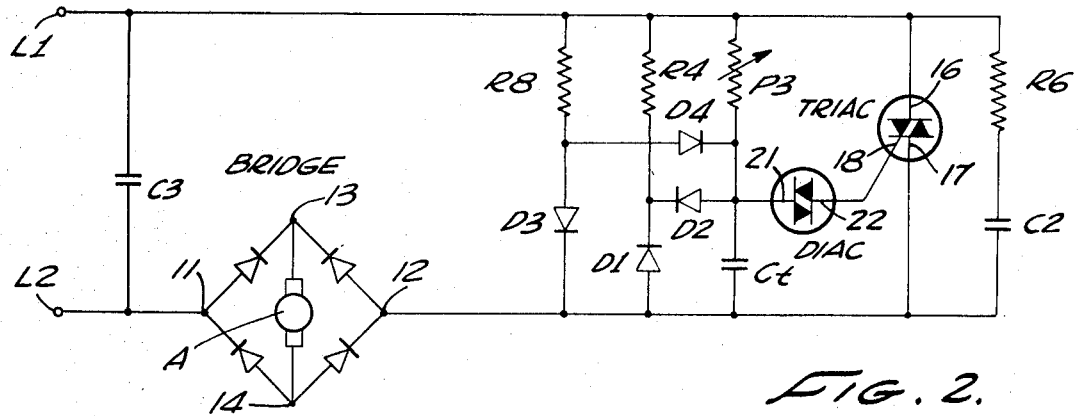
FIG. 2 is a schematic diagram of another form of motor speed control circuit in accordance with the present invention.
Figure 3:
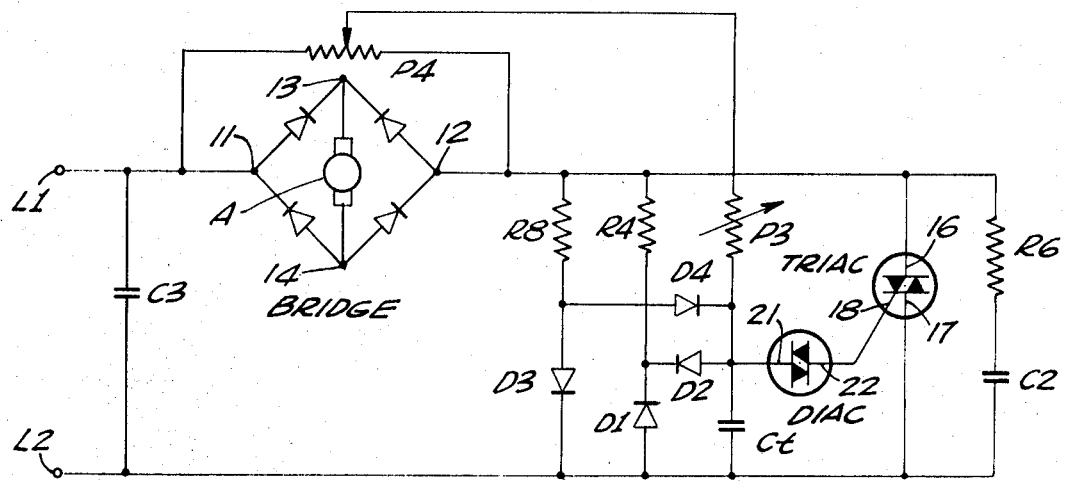
FIG. 3 is a schematic diagram of a third form of speed control circuit in accordance with the present invention.

In the circuit of FIG. 1 the speed-setting potentiometer is designated as P1, and in the circuits of FIGS. 2 and 3 the speed-setting potentiometer is designated as P3. The speed-setting potentiometer is operated manually in order to select the voltage applied to the load, and thereby select the normal operating speed of the motor. Once the operating speed of the motor has been selected the function and purpose of the motor controller is to maintain that operating speed, despite variations both in the mechanical load on the motor and in the supply line voltage.

DETAILED DESCRIPTION—FIGURE 2

In the circuit of FIG. 2 the speed setting potentiometer P3 is connected between supply terminal L1 and the input electrode 21 of the Diac. Thus, the setting of P3 directly controls the charging rate of timing capacitor Ct.

Two separate reset circuits are used for resetting the timing capacitor Ct for each half-cycle.

One reset circuit includes resistor R4 and Diodes D1 and D2. Its function is to reset the timing capacitor Ct at the end of each positive half-cycle of the supply voltage (that is, positive on supply terminal L1 relative to supply terminal L2). Resistor R4 is connected to terminal L1, the cathode of D1 is connected to the other end of R4, and the anode of D1 is connected to input terminal 12 of the Bridge. The cathode of D2 is connected to the cathode of D1 and the anode of D2 is connected to input electrode 21 of the Diac. The construction and operation of this reset circuit is generally conventional.

A second reset circuit includes resistor R8 and Diodes D3 and D4. The function of this reset circuit is to reset the timing capacitor Ct at the end of each negative half-cycle of the supply voltage. Resistor R8 is connected to supply terminal L1 and the anode of Diode D3 is connected to the other end of R8. The cathode of Diode D3 is connected to input terminal 12 of the Bridge. The anode of Diode D4 is connected to the anode of D3 and the cathode of D4 is connected to input electrode 21 of the Diac.

In the most significant application of the circuit of FIG. 2 the motor with which it is used is capable of acting as a generator, generating a substantial amount of counter electromotive force (hereinafter referred to as CEMF). The motor may, for example, be of the permanent magnet field type or of the shunt wound field type. The significant factor is that, during the portion of each half-cycle when current flow from the supply line is not permitted, the motor acts as a generator and generates a measurable CEMF which appears across the armature. The polarity of the CEMF is opposite to the polarity of the supply line voltage as it reaches the motor.

Figure 4:
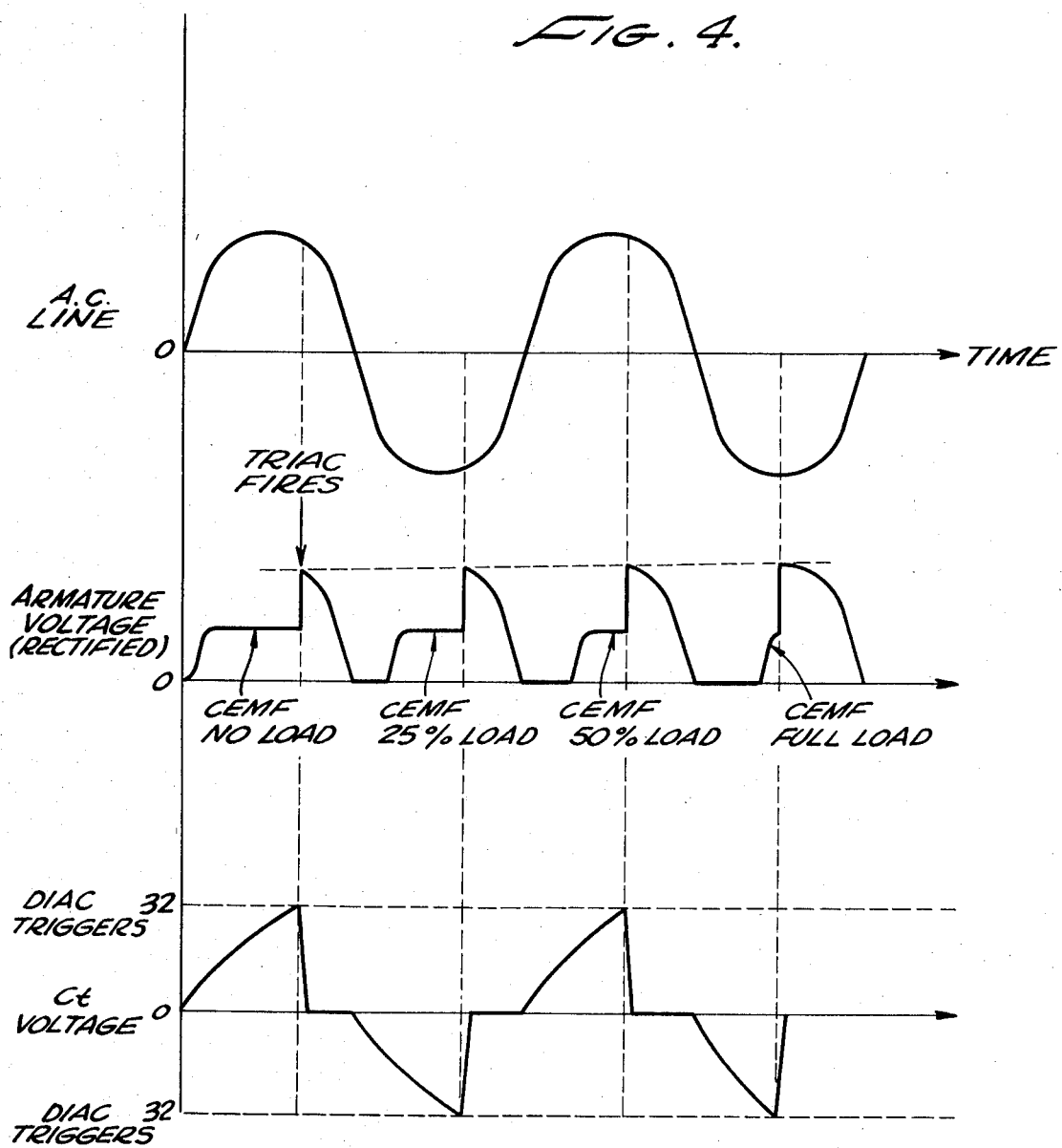
FIG. 4 is a wave form diagram illustrating the operation of the invention.

The operation of the circuit may be better understood with reference to FIG. 4 of the drawings. At the top of FIG. 4 there is shown the alternating voltage supplied from the external source and which is received on the supply terminals L1 and L2. The bottom wave shown in FIG. 4 represents the voltage on the timing capacitor Ct. Here it is seen that the voltage on capacitor Ct builds up (in a somewhat exponential fashion) during about the first half or two-thirds of the applied half-wave of the supply voltage. Then the breakover voltage (assumed to be 32 volts for the Diac is reached, and the Diac triggers. Timing capacitor Ct is promptly discharged back to a zero voltage, at which level it remains for the final portion of the applied half-wave of voltage. Then during the next succeeding half-wave of the supply line voltage (which is of opposite polarity) the timing capacitor becomes charged in the opposite direction and again triggers the Diac when the breakover voltage is reached.

The center wave form in FIG. 4 shows the typical voltage wave appearing across the motor armature, under conditions of varying load. Four successive half-cycles of the supply voltage are shown in FIG. 4 and it is assumed that the mechanical load on the motor is zero, 25 percent of full load, 50 percent of full load, and then 100 percent of full load, during these four successive half-cycles. Under the no load condition the triggering of the Diac is delayed to its latest point, and there is a relatively large portion of the half-cycle during which the motor acts as a generator and generates a measurable CEMF. The amount of energy drawn from the supply line is limited because of the relatively short duration of the conduction period of the Triac. As the mechanical load on the motor increases the firing point advances to an earlier and earlier point in the half-cycle, so that for the full load condition the Diac (and hence the Triac) triggers at about the 90° point (or perhaps somewhat earlier) in the applied half-wave of voltage. The amount of energy drawn from the supply circuit is, therefore, much larger.

A significant feature of the motor operation, which is illustrated by the waveforms of FIG. 4, is apparently due to the inherent inductance of the armature winding. As the mechanical load on the motor increases the time duration of each current pulse which it receives becomes longer and the driving voltage associated with the current also increases slightly. After the main current pulse is over the Diodes of the Bridge rectifier circuit serve as freewheeling Diodes to absorb that would otherwise be the inductive kick of the armature. During the time that this inductive kick is being absorbed it precludes the generation of measurable CEMF voltage. Therefore, the CEMF voltage which was large compared to the voltage received from the supply line under conditions of no load on the motor, becomes very small in comparison to the applied supply line voltage when the motor is under full load.

Thus, in the circuit of FIG. 2 it is significant that as the motor is loaded the CEMF diminishes, allowing timing capacitor Ct to charge faster, advancing the triggering of the Triac and hence applying more power to the motor.

DETAILED DESCRIPTION—FIGURE 3

The circuit of FIG. 3 is generally the same as the circuit of FIG. 2, however, the Bridge is connected in the L1 line rather than in the L2 line. A potentiometer P4 is connected between the input terminals 11,12 of the Bridge, and the upper end of speed potentiometer P3 (formerly connected to terminal L1) is now connected to the movable tap on potentiometer on P4.

In the circuit of FIG. 3 the movable tap of potentiometer P4 may be moved to its right hand position, which coincides with the input terminal 12 of the Bridge. In that position of the potentiometer the circuit operation is the same as for the circuit of FIG. 2.

However, the movable tap of P4 may also be located in an intermediate position, as shown in the drawing, and in that event the feedback voltage which is developed across the motor is divided by the potentiometer P4 and only a portion of that feedback voltage is applied to the speed setting potentiometer P3 and timing capacitor Ct. A reduction in the feedback voltage causes the operation of the Triac and Diac to be affected still by the load on the motor, but to a lesser degree.

It will be noted that neither the circuit of FIG. 2 nor the circuit of FIG. 3 contains any special provision to compensate for variations in the supply line voltage.

DETAILED DESCRIPTION—FIGURE 1

The circuit of FIG. 1 includes a basic similarity to the circuit of FIG. 2 but has certain differences.

Thus, the circuit of FIG. 1 contains only one reset circuit for resetting the timing capacitor Ct at the end of each positive half-cycle.

The circuit of FIG. 1 also includes provision for line voltage compensation, consisting of resistor R3 and Zener Diodes Z. The resistor R3 is connected to terminal L1 and the Zener Diodes Z are connected between the other end of R3 and input terminal 12 of the Bridge. Diodes Z are a matched pair of Diodes connected back to back. A significant voltage drop is developed across resistor R3, and when there are variations in the supply line voltage the operation is such that substantially the entire amount of the variation appears across R3, and thus the voltage across the Zener Diodes Z remains stable. Speed potentiometer P1 is connected between the juncture of R3 and Z, and input electrode 21 of the Diac. Thus, the operating speed of the motor may be selected by a proper setting of potentiometer P1 and subsequent variations in supply line voltage will have no significant effect.

The circuit of FIG. 1 also contains a feedback loop which includes resistor R5, capacitor C4 and potentiometer P2. Resistor R5 is connected to supply terminal L2, capacitor C4 is connected in parallel with resistor R5, and potentiometer P2 is connected between the other end of R5 and the input electrode 21 of the Diac.

In the circuit of FIG. 1 the inclusion of the Zener Diodes Z for purpose of line voltage regulation also have the effect of eliminating the feedback path which existed in the circuits of FIGS. 2 and 3. Hence, the R5, P2 loop is provided to add a new feedback path. The value of P2 is adjusted to control the amount of feedback voltage. Capacitor C4 is included in order to avoid an oscillating tendency of the motor which might otherwise occur.

The operation of the circuit of FIG. 1 is as follows:

On the posiive half-cycle the charging current for capacitor Ct flows through terminal 12 to terminal 13 of the Bridge, through the armature A to terminal 14 and hence to terminal 11, then through R5 and P2 to Ct. The feedback path, however, is from L2 to terminal 11 to terminal 14 through A to terminal 13 and terminal 12 and hence through Ct and P1 and R3 to L1.

On the negative half-cycle the paths for both charging current and feedback remain the same, however, the current and voltage polarities are reversed

CIRCUIT VALUES

Typical circuit values for the illustrated circuits of the present invention are as follows:

P1=100 kΩ pot.—connected as variable resistor
P2=250 kΩ pot.—connected as variable resistor
P3=250 kΩ pot.—connected as variable resistor
P4=10 kΩ pot.—connected as a potentiometer
R3=5 kΩ
R4=15 kΩ
R5=100 kΩ
R6=100 Ω
R8=15 kΩ
Ct=0.1 μf
C2=0.1 μf
C3=0.1 μf
C4=0.01 μf
D1, D2, D3, D4 = semiconductor diodes The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A triac motor speed control circuit comprising:
   a pair of supply line terminals;
   a triac;
   a diode bridge rectifier having its input terminals coupled in series with the main current path of said triac, the series combination of said bridge rectifier and said triac being coupled across said pair of supply line terminals;
   a diac having one terminal coupled to the control gate of said triac;
   a speed potentiometer and a timing capacitor coupled together in series, the series combination thereof being coupled in parallel to said triac, said timing capacitor being also connected between said other terminal of said diac and one main current terminal of said triac;
   means for coupling a motor armature to the output terminals of said bridge rectifier;
   a first reset circuit including a resistor and a first diode coupled in series with each other and in parallel with the main current path of said triac, and a second diode having one terminal connected to the juncture of said resistor and said first diode in polarity opposite to that of said first diode, and its other terminal connected to the other terminal of said diac; and
   a second reset circuit coupled in parallel to said first reset circuit but with diodes connected in opposite polarity.

2. A triac motor speed control circuit comprising:
   a pair of supply line terminals;
   a triac;
   a diode bridge rectifier having its input terminals coupled in series with the main current path of said triac, the series combination of said bridge rectifier and said triac being coupled across said pair of supply line terminals;
   a diac having one terminal coupled to the control gate of said triac;
   a speed potentiometer and a timing capacitor coupled together in series, the series combination thereof being coupled in parallel to said triac, said timing capacitor being also connnected between said other terminal of said diac and one main current terminal of said triac;
   means for coupling a motor armature to the output terminals of said bridge rectifier;
   a first reset circuit including a resistor and a first diode coupled in series with each other and in parallel with the main current path of said triac, and second diode having one terminal connected to the juncture of said resistor and said first diode in polarity opposite to that of said first diode, and its other terminal connected to the other terminal of said diac;
   a second reset circuit coupled in parallel to said first reset circuit but with the diodes connected in opposite polarity; and
   a feedback potentiometer connected across the input terminals of said bridge rectifier, said bridge rectifier being coupled to the other main current terminal of said triac and said feedback potentiometer having a movable tap which is connected to one end of said speed potentiometer.

3. A triac motor speed control circuit comprising:
   a pair of supply line terminals;
   a triac;
   a diode bridge rectifier, the input terminals of said bridge rectifier being coupled in a series loop with the main current path of said triac across said pair of supply line terminals;
   a diac having one terminal coupled to the control gate of said triac;
   a speed potentiometer and a timing capacitor coupled together in series, said timing capacitor being connected between the other terminal of said diac and one main current terminal of said triac, said bridge rectifier being also coupled to said one main current terminal of said triac;
   means for coupling a motor armature to the output terminals of said bridge rectifier;
   a reset circuit including a resistor and a first diode coupled in series with each other and in parallel with the main current path of said triac, and a second diode having one terminal connected to the juncture of said resistor and said first diode in polarity opposite to that of said first diode, and its other terminal connected to the other terminal of said diac;
   a line voltage compensation circuit having a resistor and a back-to-back pair of Zener diodes connected in series, the series combination thereof being coupled in parallel with the main current terminals of said triac, the series combination of said speed potentiometer and said timing capacitor being connected in parallel with said Zener diodes; and a feedback loop connected between said other terminal of said diac and the supply line side of said bridge rectifier.

4. A motor speed control circuit as claimed in claim 3 wherein said feedback loop includes a fixed resistor, a capacitor in parallel with said fixed resistor, and a variable resistor in series with said fixed resistor.

5. A triac motor speed control circuit comprising:

a pair of supply line terminals;

a triac;

a diode bridge rectifier having its input terminals coupled in series with the main current path of said triac, the series combination of said bridge rectifier and said triac being coupled across said pair of supply line terminals;

a diac having one terminal coupled to the control gate of said triac;

a speed potentiometer and a timing capacitor coupled together in series, the series combination thereof being coupled in parallel to said triac, said timing capacitor being also connected between the other terminal of said diac and one main current terminal of said triac;

said diode bridge rectifier being coupled to the other main current terminal of said triac;

a reset circuit including a resistor and a first diode coupled in series with each other and in parallel with the main current path of said triac, and a second diode having one terminal connected to the juncture of said resistor and said first diode in polarity opposite to that of said first diode, and its other terminal connected to the other terminal of said diac;

a motor of a type such that it acts as a generator when current is not being supplied to its armature, the motor armature being coupled to the output terminals of said bridge rectifier;

and a feedback potentiometer connected across the input terminals of said bridge rectifier, said feedback potentiometer having a movable tap which is connected to one end of said speed potentiometer;

the operation being such that the counter electromotive force generated by said motor when said triac is nonconductive diminished with increasing load on the motor thus tending to stabilize the motor speed.

6. A motor speed control circuit as claimed in claim 5 which additionally includes a second reset circuit coupled in parallel to said first-named reset circuit but with diodes connected in opposite polarity.

7. A triac motor speed control circuit comprising:

a pair of supply line terminals;

a triac;

a diode bridge rectifier having its input terminals coupled in series with the main current path of said triac, the series combination of said bridge rectifier and said triac being coupled across said pair of supply line terminals;

a diac having one terminal coupled to the control gate of said triac;

a speed potentiometer and a timing capacitor coupled together in series, the series combination thereof being coupled in parallel to said triac, said timing capacitor being also connected between the other terminal of said diac and one main current terminal of said triac;

a reset circuit including a resistor and a first diode coupled in series with each other and in parallel with the main current path of said triac, and a second diode having one terminal connected to the juncture of said resistor and said first diode in polarity opposite to that of said first diode, and its other terminal connected to the other terminal of said diac;

a motor of a type such that it acts as a generator when current is not being supplied to its armature, the motor armature being coupled to the output terminals of said bridge rectifier;

and a feedback loop coupled between said other terminal of said diac and the supply line side of said bridge rectifier;

the operation being such that the counter electromotive force generated by said motor when said triac is nonconductive diminishes with increasing load on the motor thus tending to stabilize the motor speed.

8. A motor speed control circuit as claimed in claim 7 wherein said feedback loop includes a fixed resistor, a capacitor in parallel with said fixed resistor, and a variable resistor in series with said fixed resistor; said diode bridge rectifier being coupled to said one main current terminal of said triac;

9. A motor speed control circuit as claimed in claim 7 wherein said diode bridge rectifier is coupled to the other main current terminal of said triac, and wherein said feedback loop includes a feedback potentiometer connected across the input terminals of said bridge rectifier, said feedback potentiometer having a movable tap which is connected to the resistor end of said speed potentiometer.

10. A motor speed control circuit as claimed in claim 7 which further includes a line voltage compensation circuit having a resistor and a back-to-back pair of Zener diodes connected in series, the series combination thereof being coupled in parallel with the main current terminals of said triac, the series combination of said speed potentiometer and said timing capacitor being connected in parallel with said Zener diodes.

* * * * *